United States Patent Office 2,954,293
Patented Sept. 27, 1960

2,954,293

PREPARATION OF CHOCOLATE FLAVORING

Irving I. Rusoff, Park Ridge, N.J., assignor to General Foods Corporation, White Plains, N.Y., a corporation of Delaware No Drawing. Filed Feb. 28, 1958, Ser. No. 718,153

18 Claims. (Cl. 99—26)

The present invention relates to cacao products and to a process for producing the same, particularly to a water-soluble flavor concentrate having the full-bodied chocolate flavor and aroma and to a process for obtaining the same. This application is a continuation-in-part of my co-pending application, Serial No. 367,350, now U.S. Patent No. 2,835,585.

Generally, in preparing chocolate flavored beverages, such as chocolate milk and carbonated or non-carbonated chocolate drinks, the chocolate flavor is imparted to the beverage by using a low-fat cacao material, such as cocoa powder. At best, it provides a turbid product and, therefore, its use is mainly confined to milk. Even then it presents a problem in that some of the cocoa particles settle out and collect on the bottom of the bottle or other container in the form of a sediment. Many proposals have been advanced for dealing with the problem. For example, it has been suggested that gelatinized starches, such as arrowroot, sago, and the like, be added to the beverage to hinder settling of the insoluble particles. Other suggested additives have included gelatin, pectin and various vegetable gums. Of these materials the vegetable gums have attained a more widespread use than have the other materials. Examples of some of the gums which have been used include gum tragacanth, gum arabic, gum karaya, agar-agar and Irish moss, of which Irish moss, with or without the addition of starch, has been most favored. However, none of the above mentioned proposals have resulted in a satisfactory solution to the problem due to the foreign taste, increased viscosity, and in some cases the sliminess caused in the product by the additives.

On the other hand, attempts have been made to prepare water-soluble products containing the full-bodied chocolate flavor and aroma. Difficulty is had with the separation of the water-soluble materials from the roasted cacao material, particularly from the fat, the hemicellulose and the starch content. Attempts have been made to use high temperatures for the purpose of hydrolyzing the hemicelluloses and gelatinizing the starch so that the same may be ultimately converted to water-soluble sugars. This has mainly served to deteriorate the flavor and remove practically all of the aroma from the product, the problem of separating the water extract from the fat remaining. Thus, such water extracts are possessed of only inferior flavor and aroma and although efforts have been made to concentrate the extracts they are still weak with regard to flavor. Such heat treatment serves mainly to demonstrate the susceptibility of the chocolate flavor and aroma to deterioration at high temperatures. For this reason the extract is not dried, but is usually handled as a concentrated solution. This introduces the possibility of bacterial spoilage as still another disadvantage.

Many of the foregoing disadvantages and difficulties have been overcome by employing the invention described in my co-pending application, Serial No. 367,350, filed July 10, 1953, now U.S. Patent No. 2,835,585. Briefly, the invention described in that patent application comprises contacting fermented unroasted cacao material containing precursors of chocolate flavor and aroma with an aqueous extraction liquid. This aqueous extraction liquid is preferably at an elevated temperature, whereby substantial quantities of water-soluble chocolate flavor and aroma precursors are extracted from the unroasted cacao material and pass into the liquid. Thereafter the cacao material is separated from the extract containing these chocolate flavor and aroma precursors and the extract is evaporated to form a semi-solid mass, evaporation being carried out at a temperature below roasting temperatures. Finally, the semi-solid mass is roasted, the roasting being carried out preferably at a temperature between 190°–350° F. for a time sufficient to develop flavor and aroma.

The products of my co-pending application and the process whereby it is derived offer a number of advantages including a water-soluble and readily suspensible flavoring composition free of extraneous undesirable solids. This composition does contain a certain quantity of tannins and alkaloids which impart a more full-bodied chocolate flavor. However, some consumers prefer a more astringent and more bitter flavoring material and it would be desirable therefore to provide a substantially water-soluble chocolate flavoring composition which is more greatly endowed with quantities of tannins and alkaloids.

Also, it has been noted that while the water extract of unroasted cacao material has a high degree of characteristic chocolate aroma notes, many desirable chocolate aroma notes are lost in the course of concentrating. Other chocolate aroma notes which would normally be developed during the roasting process and are present in the flavoring composition are lost. Again, since many people would prefer a more aromatic flavoring composition, it would be desirable to provide such a composition while at the same time offering the advantages of substantial water solubility.

Moreover, for some end uses it would be desirable to have present in the flavoring product a quantity of fat, viz., cocoa butter which imparts a quality of richness to a confectionery or beverage product. It would be desirable, however, in meeting such end uses that the chocolate flavoring composition not have present cacao solids which as in the case of low fat cacao material require some type of suspending medium.

In addition, the normal extract of unroasted cacao material is substantially colorless and remains so even after roasting. It would be desirable to provide a water-soluble flavor product which in addition to having a desirable chocolate flavor and aroma has a dark color like that normally associated with chocolate.

A general object of the present invention is to provide a flavoring material which is greatly endowed with desirable astringent and/or bitter principles as well as chocolate flavor and aroma principles.

Another object of the present invention is to provide a chocolate flavoring material which, in addition to being greatly endowed with bitterness and/or astringent principles, is highly soluble in water and substantially free of non-suspensible solids so as to be satisfactory for general flavoring purposes.

Still another object of the invention is to provide a chocolate flavoring material of the above-stated character which possesses a greater preponderance of desirable chocolate aroma notes even after the extract has been concentrated and roasted to produce the flavor.

A still further object is to provide a chocolate flavoring material of the above-stated character which has a darker and more chocolate-like color. These and other objects will become apparent from the following detailed description.

It has now been discovered that a flavoring material satisfying all of the foregoing objects can be provided by extracting unroasted fermented cacao beans and similar cacao material with a mixture of one or more organic solvents and water. Such a solvent mixture serves to remove, in addition to the water-soluble chocolate flavor and aroma precursors, other materials not readily extractable with water including certain alkaloids such as theobromine and caffeine, as well as tannins and anthocyanins. The extract is thereafter separated from the residual cacao material, concentrated to a semi-solid mass, and roasted to develop the characteristic chocolate flavor and aroma.

Preferably the solvent mixture of the present invention is one wherein the organic solvent or solvents are volatile. The solvent mixture may be binary, trinary, or quaternary. Thus, a single water miscible solvent like acetone, methanol, ethanol or isopropanol may be employed singly with water. Alternatively, mixtures of organic solvents such as the foregoing alcohols, acetone, ethyl ether, ethyl acetate, benzene or any non-polar organic solvent can be used in combination with water. In general, in addition to the desirable water-soluble flavor and aroma constituents extracted by the water and the alkaloids, tannins and other materials like anthocyanins which would be extracted by the organic solvent, the triglyceride, normally designated as cocoa butter, will be extracted. For most purposes it will be found desirable to employ one or more organic solvents which can be characterized as "volatile solvents," that is, those which would be volatilized at below the boiling point of water and above ambient temperatures; in this way the task of separating the organic solvent from the extract is greatly simplified.

As is the case for the flavor product described in my co-pending appliction, much of the characteristic flavor and aroma is water-soluble and requires roasting for development of its flavor. Such roasting generally involves subjecting the extract to an elevated temperature and for a time sufficient to develop a substantially anhydrous reaction mixture at least at the end of the flavor-producing reaction. The term "substantially anhydrous" is not meant to exclude the presence of some water in solution. In fact, a small amount of water is formed continuously during the course of reaction, which fact alone is sufficient to preclude a completely anhydrous molten state at the end of the reaction. Thus, as much as 5–10% moisture may be present in the flavor product at the end of the flavor-producing reaction. A good rule to observe in determining whether the product is substantially anhydrous is that the product upon cooling to room temperature is substantially solid and substantially dry to the touch. Generally it has been found that at temperatures between 190°–350° F. (preferably 230°–285° F.) at normal atmospheric conditions the chocolate flavor precursors will produce desired chocolate flavor and aroma.

One of the primary discoveries upon which the present invention is based is that the flavor and aroma precursors in unroasted cacao material are extractable by means of water and one or more organic solvents and that chocolate flavor and aroma can be produced from the extract after concentration and roasting. A collateral discovery, however, is that such extracts contain an abundance of alkaloids, tannins and other coloring matter which are not readily extractable. For many popular tastes a high proportion of theobromine or caffeine in the flavoring material, for example, is preferred in supplying bitterness to the natural product. Similarly, an astringency such as is offered by those tannins extracted in accordance with the present invention is desired by some. The process of the present invention allows the production of a chocolate flavoring material which is free of solids and yet which possesses a substantial proportion of these bitterness and astringent principles as well as the chocolate flavor and aroma values desired. The result is a more full-bodied chocolate flavor and aroma product. The coloring matter extracted in accordance with the present invention includes such materials as the anthocyanins and catechins, which, during the course of the flavor-producing reaction, viz., roasting, impart a darker color to the flavor product, thereby eliminating the necessity for adding extraneous coloring matter and allowing the product to be identified as "natural."

Accompanying the foregoing extracted materials in the solvent mixture of the present invention will be the triglyceride cocoa butter, which possesses natural anti-oxidants which provide high stability to the cocoa butter. These anti-oxidants are also extractable with the triglycerides using the solvent mixture of the present invention. Normally, cocoa butter which is recovered by the traditional technique of pressing roasted cacao nibs contains natural anti-oxidants. But in the course of subsequent processing of the cocoa butter to remove flavor and aroma so that it may be used for pharmaceutical or cosmetic purposes, it happens that many of the natural anti-oxidant materials present are also removed; consequently other anti-oxidants have to be added.

In accordance with the present invention the cocoa butter is recovered together with its natural anti-oxidants, but in a state whereby non-fatty materials can be separated without loss of these natural antioxidants. This is achieved by separating the cocoa butter from the extract of the present invention. For example, a solvent mixture comprising acetone and water can be used to extract the unroasted cacao materials. Thereafter the extract is introduced to an appropriate organic solvent for the cocoa butter, e.g., a chlorinated hydrocarbon like carbon tetrachloride, chloroform, trichloroethylene, etc. Alternatively, the volatile organic solvent in the solvent mixture used to extract the unroasted cacao nibs can be vaporized from the extract leaving a non-fat miscible layer of flavoring material and a readily separable layer of cocoa butter thereabove.

It has also been noted when employing a solvent mixture in accordance with the present invention that the triglyceride material extracted with the chocolate flavoring material serves to absorb chocolate aroma and flavor precursors as well as other materials like caffeine which otherwise would be lost through evaporation in the course of concentrating the extract. In addition, it appears that the extracted triglyceride material serves to absorb many of the chocolate flavor and aroma constituents which would normally be lost during roasting. To produce a completely water miscible flavor product, the triglyceride material in the roasted extract can be extracted therefrom with a suitable solvent such as carbon tetrachloride, a straight chain hydrocarbon solvent like hexane, or a solvent like ethyl ether.

Also, the extract may be treated with solvents such as chloroform, trichloroethylene, acetone, or hexane, to selectively remove the alkaloid, tannin or fat and thereby adjust the content of such materials in the extract without detriment to the flavor and aromo. Theobromine and caffeine are the alkaloids normally present in chocolate materials and are considered objectionable in some uses of chocolate. Use of chlorinated solvents such as chloroform and trichlorethylene present a convenient method for their removal from the extract, the flavor eventually produced from the extract being reincorporated into the cacao residue from the original extraction or used as such. Use of hexane to remove fat insures complete water solubility for the flavor extract, while use of acetone will remove the undesirable tannins.

The unroasted chocolate materials to which the process of the present invention can be applied consist of all types and varieties of fermented or cured cacao beans of any form, or shells from these beans. For an example of curing, see U.S. Patent No. 2,558,854. The preferred form of the cacao material used in the extraction is broken beans which result from passing whole beans through a cracker to break up the bean and then a fanning device to remove shell particles. However, any form of cacao, as mentioned above, from whole beans to finely ground beans can be used in the process. Although fat extracted beans may be used, it is unnecessary to extract the cocoa butter prior to extraction of flavor precursors.

The solvent mixture preferably used in the process of this invention is acetone and water. However, other solvents containing water in varying amounts can be used. Acetone-water mixtures up to 60% acetone will extract the chocolate precursors as will alcohol-water mixtures employing ethanol or methanol. Other organic solvents which may be used are carbon tetrachloride, chloroform, isopropanol, benzene, ethyl acetate, halogenated benzene, and the like. Use of these mixtures produces an extract which is higher in tannins than the pure water extracts of my co-pending application, referred to above, and which are also much higher in fat content. It has been found that adjustment of the extracting solvent mixture up to pH 8.5 with any of the materials normally used to "dutch" cacao such as sodium carbonate, potassium carbonate, or sodium hydroxide results in an extract having the mild "dutched" flavor on roasting and a much darker color.

Extraction of the chocolate precursors from the unroasted cacao can be accomplished over a wide range of temperatures. It has been found that some degree of extraction can be obtained employing extraction temperatures ranging from the temperature of ice water, say 35° F., to temperatures as high as 400° F. and above. It is preferred, however, for practical reasons to use extraction temperatures from about 55° F. to about 325° F., and still more preferred to operate at about 200° F. under pressure. At temperatures below 100° F. the rate of extraction is too low for efficient commercial operation, although the resulting extract is of high quality. Extraction temperatures substantially in excess of 325° F. may result in a higher yield of soluble solids but the aroma and flavor of this solids are often of an inferior quality. Extractions are conducted below the boiling point of the solvent mixture being used, at the particular pressure of operation.

Another factor to be considered in the process of the present invention is the length of time required for extraction of the cacao material. This is variously influenced by the other factors in the process. A relatively high temperature of extraction would require a shorter time and vice-versa to obtain maximum yields of extract. Within limits, an increase in extracting time results in an increase in the yield of final dry extract. With the weight ratio of acetone-water mixture to cacao material of 5:1 and an extraction temperature of 140° F., extraction for 4 hours gives about an 18% increase in yield of extracted solids over a 2 hour extraction under otherwise identical conditions. The extraction is substantially exhaustive for this temperature after 4 hours. No flavor differences in the final product are found between the two extracts. At 200° F., the preferred temperature of extraction, substantially complete extraction is obtained after about 1 hour. At higher extraction temperatures the use of excessively long periods of time for extraction may give rise to off-flavors and should be avoided.

The weight ratio of the solvent mixture to the cacao material being extracted may be varied according to the time and temperature of extraction and the yield desired. It is preferred to use an amount of solvent mixture which is about 5 times the weight of the cacao material since this provides for most economical commercial operation under usual conditions of temperature and time of extraction.

Another factor to be considered in connection with the extraction is the degree of subdivision of the cacao beans or other cacao material. Needless to say, to some extent subdivision facilitates the extraction. However, if the cacao material is subdivided to a great degree, difficulty can be expected with regard to the subsequent separation of the aqueous extract. This difficulty could require the use of filter aids which, of course, would be objectionable as far as the subsequent use of the residual extracted cacao material is concerned. It has been found that the optimum degree of subdivision is represented by that of the broken beans and, accordingly, their use is preferred. In such a case it is preferred also to employ percolation extraction techniques, which are described in detail below. While the use of percolation offers advantages, particularly in separating the extract from the residual cacao material and in obtaining an extract of high initial concentration, various other methods for extraction may be employed with good advantage. Such other methods involve the use of a horizontal revolving extracting reel through which the solvent mixture and cacao material may be passed cocurrently or countercurrently with respect to each other. Extraction kettles may be employed if a batch operation is desired. Also, liquid-liquid extraction techniques may be employed if the cacao material is in a suspension or solution. Although the use of the percolation technique, as mentioned above, serves to partially filter the cacao materials from the aqueous extract, it may be necessary to follow up the percolation with a clarification step. Moreover, the other methods of extraction employed required a filtration step. Such filtration may be effected by any conventional means such as a plate and frame filter, a filter wheel and, of course, a centrifuge may be employed if desired. Also, suction or reduced pressure may be employed as well as pressure, if desired.

Generally, the concentration of non-fat solids in the extract of cacao material obtained in accordance with the present invention is 2–8%. This must be concentrated in order to effect the subsequent roasting step. Any temperature and pressure combination that may be desired can be used to a point where the extract is about 50% soluble solids. At this point care should be taken since the development of the flavor and aroma is believed possible at this moisture content, although it occurs only to a slight degree.

By the time the concentration has proceeded to a point where the residue contains 20–30% moisture, the development of flavor and aroma begins to occur to a much greater degree so that care must be taken in connection with the conditions used for concentration, particularly temperature and vacuum. The use of extremely high temperatures, for example, would serve to deteriorate the flavor and drive off the aroma, while the use of reduced pressure would remove aroma. However, the major development of the flavor and aroma occurs when the concentrate is in a substantially dry condition and is being subjected to roasting temperatures, so that the aforementioned precautions relate to the loss of flavor and aroma during concentration and are not of critical importance.

The use of freeze-drying or lyophilization is, of course, a very convenient method for avoiding all of the above discussed difficulties with concentration. Generally, a 30% solution may be freeze-dried to a point where the extract contains only 1–10% moisture. Roasting is then easily effected without any fear of losing flavor and aroma. On the other hand, the lyophilization technique is generally an expensive one and it is preferred from a standpoint of economy to use controlled methods of heat evaporation.

Roasting is achieved by subjecting the soluble solids of the extract to a temperature from about 190° F. to about 350° F. for periods of time up to about 17 hours. Some additional chocolate flavor is developed in extracted solids roasted for the longer periods at 190° F., but such is not very significant. The time and temperature required to properly develop chocolate flavor and aroma in the soluble solids of the extract depends on the method and apparatus used. One preferred method of roasting involves remoistening of the dried extract by addition of 25% water, spreading the material in a thin film on a stainless steel tray, evaporating the material to about 5% moisture over a stream bath and thereafter subjecting the material to roasting temperatures. When this method is employed, temperatures of from about 250° F. to about 285° F. for periods of time from about 12 minutes to about 3 minutes respectively are preferred.

A further preferred method of roasting involves combined drying and roasting of the liquid extract by spray drying procedures as described in detail below. With inlet air temperatures of 650°–675° F. and outlet gas temperatures between 280° F. and 300° F. satisfactory flavor and aroma are developed. It is thought, however, that the product temperature seldom rises above 200° F. under these conditions and the time of exposure to these temperatures is of the order of from 20–30 seconds.

The development of flavor and aroma in the extract appears to require that the material be substantially free from moisture at the time of roasting. However, it may be convenient to subject the extract to roasting temperatures when the moisture content has been reduced to as little as from 30–50% since it is believed that none of the development of flavor and aroma begins to occur at such relatively high moisture levels. Moreover, there is some reason to believe that a different and perhaps preferred flavor and aroma is developed when the material subjected to roasting temperatures has an appreciable water content at the beginning of the roasting step. When the concentration of precursors in the extract is less than 50%, the extract can be subjected to temperatures within the normal roasting range, that is, from 190° F. to 350° F.

The pressure under which the extract is roasted seems to have little influence on the amount or rate of flavor development. It is generally convenient to roast the extract open to the atmosphere to allow any moisture and organic solvent present to escape. If desired, however, comparable flavor development may be had by roasting in closed containers under varying pressures depending on the size of the container, the temperature, and the amount of moisture present.

The drying and roasting can be combined into a single step by means of spray drying at such a temperature that drying and roasting is achieved in the same operation. An indication of the conditions needed during spray drying is set forth below. This process offers an opportunity to include other materials along with the solids of the extract to serve as carriers of the flavor. Examples of these carrying materials are sucrose, dextrose, corn sugar, soluble starches, various vegetable gums, and the like. The same effect can be achieved by drum drying or pan drying.

The dry powder thus obtained has a high degree of solubility and is rapidly soluble in water and other aqueous liquids. At the level of from 7.5 to 10 grams per liter of milk, the material is quickly and completely soluble at room temperature. Also, 4 grams of roasted extract may be dissolved in 105 ml. of water with the addition of 56 grams of sucrose to make a concentrated chocolate flavored syrup.

As a further step in the processing of said chocolate flavoring material, treatment with alkali may be incorporated to give a product with a flavor and appearance of dutched chocolate. This dutching step may be carried out by treating the extract, either before or after roasting, with a mild alkali, such as 1–2.5% of sodium carbonate, potassium carbonate or sodium hydroxide, such as is customary with regular chocolate material.

The residue which remains after the extraction is completed may be dried and roasted to provide a chocolate liquor of bland flavor which may be used to advantage in blending with other chocolate liquors to produce chocolate coatings. Alternatively, the extracted nibs may be dried and pressed to remove the cocoa butter and provide a press cake which on grinding and roasting results in a cocoa powder which, in turn, may be mixed with sucrose to provide a breakfast cocoa type of product.

Another important use of the extracted nibs is that they may be treated with various chemical agents to change the color of the chocolate liquors made therefrom without significantly changing the flavor of the final product. For example, hydrogen peroxide may be used as a bleaching agent to make a light colored chocolate liquor. When regular cacao material is so treated, serious off-flavors develop. It has been found that such treatment does not develop off-flavors in the residual extracted cacao material provided by this process and that a light colored chocolate liquor suitable for blending with darker chocolate liquors may be made. Other bleaching agents such as other peroxides and peracetic acid and other peracids and the like which completely break down during the treatment and whose breakdown products are non-toxic may also be used to lighten the color of such liquors.

Exposure of ordinary cacao material to a strong acid, such as hydrochloric acid, gives a strong red color to the resulting liquor. However, off-flavors also develop. As with the bleaching agents discussed above the residual extracted cacao material of this process may be treated, for example, with 3% hydrochloric acid for 3 minutes at 60° C. to provide a product with substantially no off-flavors and with a strong red color which may be blended to advantage with other liquors. Similarly, dutching or treatment of the residual extracted cacao material with mild alkali, such as from 1 to 2½% potassium or sodium carbonate or sodium hydroxide, results in a liquor of very dark color. This material so treated may then be blended with other liquors to produce any desired results.

A still further modification is to reincorporate the dry powdered extract of this invention into a liquor made from the dried, roasted, extracted cacao material, the latter either in its normal state or having been chemically modified as described above. In this manner it is possible to modify the color or other characteristics of the chocolate without deteriorating its flavor or producing undesirable off-flavors.

Additionally, if it is desired to obtain the dry chocolate flavor concentrate of this invention having the color of dutched or alkali treated chocolate, the process may be divided into two stages. The first stage is the regular extraction of the flavor precursors from the cacao material followed by drying and roasting as described above. The second stage is a dutching of the extracted nibs for a time sufficient to develop the color desired followed by a second extraction of the cacao material to remove the colored material which is then dried and added to the dried flavor extract. The desired color is thereby provided and at the same time a large part of the dutched flavor is avoided.

It is obvious that other flavor and/or taste ingredients may be added to the extract of chocolate precursors prior to roasting in order to achieve various flavor nuances and that although the preferred embodiment of the cacao extract of this invention is a dry powder, this powder may be partially reconstituted with water and used as a concentrated liquid extract for flavoring purposes.

In accordance with one specific embodiment of this invention, fermented, unroasted Accra cacao beans can be cracked and fanned in order to break the beans and to remove the shell. Fifteen pounds of these broken beans then were placed in an insulated 3-inch I.D. stainless steel pipe 10 feet in length and mounted vertically with a water inlet at the bottom and with an outlet for removal of the extract at the top of the column. Appropriate retaining screens at each end of the pipe reduce the effective length of the column to approximately 9 feet 6 inches. The cacao is then extracted by admitting the solvent mixture of 60% acetone and 40% water under pressure at 200° F. into the bottom of the column at the rate of .085 gallon per minute and causing the solvent mixture to move upwardly through the beans, the extract being drawn off at the top. The rate of flow of the solvent mixture through the column may be regulated to maintain the desired temperature within the column. Extraction for one hour in this manner removes substantially all of the available soluble solids and results in about 100 pounds of extract or solution containing about 7.5 pounds of extracted cacao material.

Concentration of the extract is carried out in a steam jacketed kettle at 212° F. until the solution contains approximately 30% soluble solids. The remaining water is then removed from the concentrate by freeze drying in order that the solids may be stored without change.

For the roasting step the dry extract can be remoistened by addition of 25% water and spread in an even layer approximately ¼ inch thick on a stainless steel tray. This tray is then placed in an oven at 285° F. and the material allowed to roast for 3 minutes. Following roasting the material is allowed to cool and is removed from the tray by scraping. The process yield is approximately 7.45 pounds of a dried, roasted extract which contains about 6 pounds of fat. The product has a true dark brown chocolate color with a noticeable bitterness and astringency, and a fragrant chocolaty aroma, as well as a rich chocolaty flavor.

Four grams of the dried material are dispersed along with 18 grams of sugar and 200 grams of cold milk. The resulting beverage has an excellent chocolate flavor and aroma.

In accordance with another embodiment of this invention, fermented, unroasted Accra cacao beans are broken as described above. Ninety-six pounds of these broken beans can be extracted in the same manner as above using the solvent mixture of 60% acetone and 40% water, at a temperature of about 300° F. Six runs using a single column are required. The solvent extract is obtained at an average concentration of about 17% solids and is concentrated in a pot still at 125° F. and a vacuum of 25 inches until the solution contains about 30% solids. The liquid concentrate may then be spray dried in a Western Precipitation Company Type N spray dryer. This dryer is approximately 8 feet high and 3 feet in diameter and is of the double cone type. The drying conditions are adjusted so as to achieve drying and roasting of the extract in the same operation. Air temperature at the inlet varies between 650° F. and 675° F. while the outlet temperature is from 280°–300° F. An air flow rate through the dryer of 160 cubic ft./minute at standard conditions is used. The pump pressure (liquid) is 3 lbs./square inch (gauge) and air pressure at the fluid nozzle is 20–25 lbs./square inch (gauge) using a Spray System pneumatic atomizing nozzle (¼ J–SS). The density of the dry roasted powder obtained is 0.095 gm./cc. The fat content of the roasted product is 30%. Process yield is 30 pounds of a dry concentrated extract.

A portion of the powder prepared above is incorporated as a flavoring ingredient in a carbonated beverage and evaluated as to taste and appearance. The beverage has a good chocolate flavor and aroma.

By the term "alkoloid solvent" is meant a solvent which will selectively remove any alkaloids present in cacao material, while at the same time removing a small percentage of the fat material, since to some degree the alkaloid solvents are also fat solvents. Chlorinated hydrocarbons generally are used as solvents for the alkaloid materials, theobromine and caffeine, which are present in cacao material, but chloroform and trichloroethylene are preferred.

By the term "fat solvent" is meant a solvent which will primarily extract the fat content of cacao material. Examples of such solvents are the straight chain, saturated, unsubstituted hydrocarbons, of which hexane is the preferred solvent. Other solvents which will also extract the fat content of cacao material are the chlorinated hydrocarbons such as the various mono- or di-chloro-benzenes, trichloroethylene and chloroform. As stated above, these solvents will also extract some of the alkaloid content of the cacao material.

By the term "tannin solvent" is meant those solvents, such as acetone, which will extract mainly the tannins present in cacao material. Other solvents which will also extract the tannins are ethyl acetate and the chlorinated hydrocarbons. The chlorinated hydrocarbons are used by adding caffeine to the cacao material, thus forming a caffeine-tannin complex in the cacao material, and upon extraction of the caffeine with the chlorinated hydrocarbons, the tannins will also be extracted.

It will be understood that while the invention has been described with particular reference to the above examples, the invention is not necessarily limited thereto. Reference should therefore be had to the appended claims for a definition of the limits of the invention.

What is claimed is:

1. A process for preparing a chocolate flavoring material which comprises contacting fermented, unroasted cacao material containing precursors of chocolate flavor and aroma with a mixture of at least one water miscible organic solvent present in non-toxic amounts and water, whereby said precursors are extracted from said unroasted cacao material and pass into the extraction liquid to form an extract, separating from the cacao material the said extract containing soluble precursors of chocolate flavor and aroma, evaporating the extract to form a semi-solid mass, and roasting said mass to develop the chocolate flavor and aroma.

2. A process for preparing a chocolate flavoring material which comprises contacting fermented, unroasted cacao material containing precursors of chocolate flavor and aroma with a mixture of at least one water miscible organic solvent present in non-toxic amounts and water at 55°–325° F., whereby said precursors are extracted from said unroasted cacao material and pass into the extraction liquid to form an extract, separating from the cacao material the said extract containing soluble precursors of chocolate flavor and aroma, evaporating the extract to form a semi-solid mass, and roasting said mass to develop the chocolate flavor and aroma.

3. A process for preparing a chocolate flavoring material which comprises contacting fermented, unroasted cacao material containing precursors of chocolate flavor and aroma with a mixture of at least one water miscible organic solvent present in non-toxic amounts and water at 55°–325° F., whereby said precursors are extracted from said unroasted cacao material and pass into the extraction liquid to form an extract, separating from the cacao material the said extract containing soluble precursors of chocolate flavor and aroma, evaporating the extract to form a semi-solid mass, and roasting said concentrated extract at 190°–350° F. to develop chocolate flavor and aroma.

4. A process for preparing a chocolate flavoring material which comprises contacting fermented, unroasted cacao material containing precursors of chocolate flavor and aroma with a mixture of at least one volatile water miscible organic solvent present in non-toxic amounts and water at 55°–325° F., whereby said precursors are extracted and pass into said liquid to form an extract, separating from the cacao material the said extract containing soluble precursors of chocolate flavor and aroma, and spray drying said extract to produce said precursors in a semi-solid state at a temperature falling within the range 190°–350° F. to roast said separated precursors and thereby develop chocolate flavor and aroma.

5. A process for preparing a chocolate flavoring material which comprises contacting fermented, unroasted cacao material containing precursors of chocolate flavor and aroma with a mixture of acetone and water, whereby said precursors are extracted from said unroasted cacao material and pass into the extraction liquid to form an extract, separating from the cacao material the said extract containing soluble precursors of chocolate flavor and aroma, evaporating the extract to form a semi-solid mass, and roasting said mass to develop the chocolate flavor and aroma.

6. A process for preparing a chocolate flavoring material which comprises contacting fermented, unroasted cacao material containing precursors of chocolate flavor and aroma with a mixture of ethyl alcohol, acetone, and water, whereby said precursors are extracted from said unroasted cacao material and pass into the extraction liquid to form an extract, separating from the cacao material the said extract containing soluble precursors of chocolate flavor and aroma, evaporating the extract to form a semi-solid mass, and roasting said mass to develop the chocolate flavor and aroma.

7. A process for preparing a chocolate flavoring material which comprises contacting fermented, unroasted cacao material containing precursors of chocolate flavor and aroma with a mixture of chloroform and water, whereby said precursors are extracted from said unroasted cacao material and pass into the extraction liquid to form an extract, separating from the cacao material the said extract containing soluble precursors of chocolate flavor and aroma, evaporating the extract to form a semi-solid mass, and roasting said mass to develop the chocolate flavor and aroma.

8. A process for preparing a chocolate flavoring material which comprises contacting fermented, unroasted cacao material containing precursors of chocolate flavor and aroma with a mixture of benzene, methanol, and water, whereby said precursors are extracted from said unroasted cacao material and pass into the extraction liquid to form an extract, separating from the cacao material the said extract containing soluble precursors of chocolate flavor and aroma, evaporating the extract to form a semi-solid mass, and roasting said mass to develop the chocolate flavor and aroma.

9. A process for preparing a chocolate flavoring material which comprises contacting fermented, unroasted cacao material containing precursors of chocolate flavor and aroma with a mixture of ethyl acetate and water, whereby said precursors are extracted from said unroasted cacao material and pass into the extraction liquid to form an extract, separating from the cacao material the said extract containing soluble precursors of chocolate flavor and aroma, evaporating the extract to form a semi-solid mass, and roasting said mass to develop the chocolate flavor and aroma.

10. A process for preparing a chocolate flavoring material which comprises percolating a mixture of at least one water miscible organic solvent present in non-toxic amounts and water through an elongated column of fermented, unroasted cacao material containing precursors of chocolate flavor and aroma, whereby said precursors of chocolate flavor and aroma are extracted from said unroasted cacao material and pass into the extraction liquid to form an extract, separating from the cacao material the said extract containing soluble precursors of chocolate flavor and aroma, evaporating the extract to form a semi-solid mass, and roasting this mass to develop the chocolate flavor and aroma.

11. A process for preparing a chocolate flavoring material which comprises contacting fermented, unroasted cacao material containing precursors of chocolate flavor and aroma with a volatile water miscible organic solvent present in non-toxic amounts and water at 55°–325° F., whereby said precursors are extracted and pass into the extraction liquid to form an extract, separating from the cacao material the said extract containing soluble precursors of chocolate flavor and aroma, concentrating said extract to moisture content of less than 50%, evaporating the concentrated extract at a temperature substantially below its roasting temperature to form a semi-solid mass, and roasting said semi-solid mass at 230°–285° F. to develop the chocolate flavor and aroma.

12. A process for preparing a chocolate flavoring material which comprises contacting fermented, unroasted cacao material containing precursors of chocolate flavor and aroma with a mixture of at least one volatile water miscible organic solvent present in non-toxic amounts and water at 200° F. for 1 hour, whereby said precursors are extracted and pass into the extraction liquid to form an extract, separating from the cacao material the said extract containing soluble precursors of chocolate flavor and aroma, concentrating said extract to moisture content of less than 50%, evaporating the concentrated extract at a temperature substantially below its roasting temperature to form a semi-solid mass, and roasting said semi-solid mass at 230°–285° F. to develop the chocolate flavor and aroma.

13. The process of claim 1 where the extract is treated with a solvent to remove the tannin content before roasting.

14. The process of claim 1 where the extract is treated with a solvent to remove the fat content before roasting.

15. The process of claim 1 where the extract is treated with a solvent to remove the alkaloid content before roasting.

16. A process for preparing a chocolate flavoring material which comprises contacting fermented, unroasted cacao material containing precursors of chocolate flavor and aroma with a mixture of at least one water miscible organic solvent present in non-toxic amounts and water at 55°–325° F. for a time sufficient to provide a non-fat solids content in the extract of 2–8%, whereby said precursors are extracted and pass into the extraction liquid to form an extract, separating from the cacao material the said extract containing soluble precursors of chocolate flavor and aroma, evaporating the extract to form a semi-solid mass, and roasting said semi-solid mass to develop the chocolate flavor and aroma.

17. A process for preparing cocoa butter which comprises contacting fermented, unroasted cacao material containing precursors of chocolate flavor and aroma with a mixture of at least one water miscible organic solvent present in non-toxic amounts and water, whereby said precursors and the cocoa butter are extracted from said unroasted cacao material and pass into the extraction liquid to form an extract, separating from the cacao material the said extract containing said cocoa butter and soluble precursors of chocolate flavor and aroma, contacting said extract with an organic solvent to remove the cocoa butter, and heating the mixture of said organic solvent and cocoa butter to volatilize the organic solvent and leave the cocoa butter.

18. A process for preparing cocoa butter which comprises contacting fermented, unroasted cacao material containing precursors of chocolate flavor and aroma with a mixture of at least one water miscible organic solvent present in non-toxic amounts and water, whereby said precursors and the cocoa butter are extracted from said unroasted cacao material and pass into the extraction liquid to form an extract, separating from the cacao material the said extract containing said cocoa butter and soluble precursors of chocolate flavor and aroma, heating said extract to volatilize the organic part of said extraction mixture to produce a layer of cocoa butter above said precursors of chocolate flavor and aroma, and separating said layer of cocoa butter.

References Cited in the file of this patent

UNITED STATES PATENTS

| | | | |
|---|---|---|---|
| 341,759 | Lobeck | May 11, | 1886 |
| 1,808,831 | Borg | June 9, | 1931 |
| 1,892,449 | Dengler | Dec. 27, | 1932 |
| 1,925,326 | Kellogg | Sept. 5, | 1933 |
| 1,947,717 | Kellogg | Feb. 20, | 1934 |
| 2,014,342 | Gutekunst | Sept. 10, | 1935 |
| 2,287,444 | Morgenthaler | June 23, | 1942 |
| 2,558,854 | Kempf | July 3, | 1951 |
| 2,835,585 | Rusoff | May 20, | 1958 |